Patented June 7, 1949

UNITED STATES PATENT OFFICE 2,472,112

FIREPROOFING COATING COMPOSITION

Martin Leatherman, United States Army

No Drawing. Application December 5, 1945,
Serial No. 633,025

14 Claims. (Cl. 106—15)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to fireproofing coating compositions which are effective in rendering wood and other combustible surfaces resistant to ignition by impinging flames.

Many examples can be found in the prior art of compositions intended to impart ignition resistance to combustible surfaces but virtually all of these compositions have depended upon some water soluble ingredient such as an ammonium salt; hence they have not been able to withstand weathering, and none has been fully satisfactory. Most frequently a combustible binder has been employed in the prior art and this has lessened the desired effect.

The present invention avoids the objections of the prior art by teaching a composition comprising only water insoluble constituents and by introducing new principles not hitherto employed in the field of fireproofing coatings. In the first place, the preferred binders employed are incombustible or, at least, difficultly combustible. In the second place, explosure to ignition temperature induces changes, as will be presently described, which cause evolution of gaseous products of a highly flame preventive nature. In the third place, this invention teaches compositions which display the phenomenon of intumescence in such a manner as to offer high resistance to ignition by keeping the temperature of the combustible surface below that at which the decomposition of the said surface would become exothermic and self propagating.

Specifically, this invention teaches a mixture or combination of three essential ingredients to which others may optionally be added. One of these ingredients is a highly chlorinated, water-insoluble, organic solid material which serves the twofold purpose of a binding agent and flame-retarding agent. Any one or a combination of a number of substances may be used for my purpose. Highly chlorinated, solid paraffin wax containing approximately 70 per cent of chlorine by weight is a satisfactory material. Heavily chlorinated rubber is another example. Other examples are highly chlorinated, solid, vegetable or animal oils, polyvinyl chloride, chlorinated naphthalene, chlorinated diphenyl, resins, and similar materials. In some cases I may find it desirable to utilize difficultly combustible hardening materials to improve the film-forming properties of the coatings. Among such materials may be mentioned gilsonite, cumar resins, fossil resins and gums, and heat-bodied drying oils. It is desirable that only binding materials be used which are chlorine-resisting for reasons which will later appear. It will be noted that the primary binders not only are already essentially saturated with chlorine but they can also liberate copious quantities of chlorine-containing gases when subjected to heat within the environment of my invention. The accessory binders which I may desire to use to improve the film-forming qualities of the binder constituents are also more or less resistant to attack by chlorine.

The second important ingredient of my compositions is any one or a mixture of certain organic compounds containing trivalent nitrogen to which one or two atoms of chlorine are directly linked. These compounds, therefore, all possess the characteristic groupings

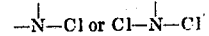

The other linkages indicated are connected to carbon atoms or atoms other than chlorine in these compounds. The compounds may contain, in addition, other chlorine atoms linked directly to carbon atoms. These compounds may be generically described as nitrogen-halogenated (N-halogenated) amines, amides, imines, and imides. Compounds of this class which are suitable are solids at ordinary temperatures and are difficultly soluble in water.

As examples to show some of the types of N-chloro groups suitable for use in compositions taught by this invention may be mentioned the following compounds:

Acetyl chloramino-2,4-dichlorobenzene:

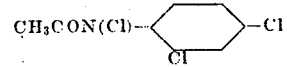

N,N¹ dichloro-N,N' dibenzoyl ethylene diamine:
$C_6H_5CON(Cl)CH_2CH_2N(Cl)COC_6H_5$ N,N'-quinonedichlorimine:

2,3,5 trichlorobenzoquinone (1,4) chlorimide:

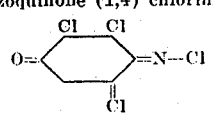

2,5 dichlorobenzoquinone (1,4) bischlorimide:

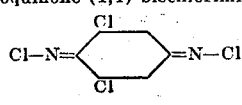

N-chlorophthalimide:

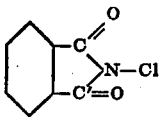

N,N dichloro-4-carboxybenzene-sulfonamide:

Dichloramine T:

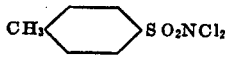

1,3,4,6 tetrachloro-7-methyl-8-phenyl glycoluril;
N,N dichloro dimethyl-hydantoin:

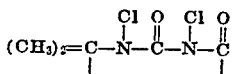

N,N dichloro barbituric acid:

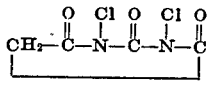

It is obvious that there are many equivalents of the examples listed here. The intumescence characteristic of compositions taught by this invention appears to arise from the presence of the N-chloro group, and the presence of this group in any compound will make that compound more or less suitable for my purpose. Certain of the exemplary compounds listed may be somewhat lacking in stability and may not be conducive to preparation of durable coatings, but this is irrelevant to the operativeness of my invention. While solid compounds are preferable for the formation of hard, abrasion-resistant coatings, there are conditions in which low-melting or even liquid N-chloro compounds may be incorporated into my compositions.

The third constituent of the composition covered by this invention is a compound capable of acting as a dechlorinating catalyst to split chlorine-containing gases from the other two ingredients under the influence of heat. A preferred catalyst is zinc oxide although other compounds such as zinc hydroxide or basic zinc carbonate, which form zinc oxide when heated, may also be used.

In adapting my invention to practice it will be desirable to utilize a volatile vehicle which is compatible with the constituents of the composition. The N-chloro compounds are characterized by a tendency to split off nascent chlorine and it is desirable to use vehicles which are relatively inert. The vehicle may take various forms. In the simplest form a volatile vehicle in which the binder is soluble may be used. In this case the N-chloro organic constituent may also be dissolved or it may be in suspension in finely divided form along with the finely divided dechlorinating catalyst. In other cases I may form a concentrated solution of the binder in an organic solvent and emulsify this solution in water by means of a suitable emulsifier such as polyvinyl alcohol, methyl cellulose, etc. In such cases the two remaining constituents will remain suspended in the aqueous medium. As examples of volatile solvents may be mentioned chlorinated solvents such as carbon tetrachloride, chloroform, tetrachlorethane, etc. Other solvents which may be utilized are hydrocarbon materials such as Stoddard solvent, benzene, toluene and synthetic aromatic solvents. In general, the amount of solvent will be such as to produce a paste consistency which is suitable for brushing or spraying on the combustible or other surface.

In certain cases all three essential ingredients of my compositions will be insoluble and will remain suspended in the vehicle. In such cases it will be necessary to first grind the three ingredients together or separately to a fine state of subdivision and then to suspend them in the vehicle which may be water. In this instance the invention will be made operable by means of an accessory binder which is dissolved in the volatile vehicle which upon evaporation will leave the active ingredients dispersed over and held to the coated surface in a film of the accessory binder. The latter may be any chlorine-resisting substance possessing suitable film-forming properties. Where water is used as the volatile vehicle water-soluble film formers such as methyl cellulose, ethyl cellulose, polyvinyl alcohol, casein, alginates, etc., may be used as the accessory binder.

The proportions of the three essential ingredients of this invention may be varied through rather wide limits without rendering the invention inoperative. For example, the dechlorinating catalyst will show some effectiveness when it is present in the ratio of only two parts to ten parts of the N-halogenated compound and ten parts of the highly chlorinated organic binder constituent. Likewise some flame-proofing and intumescence is shown when the N-halogenated compound is present in the ratio of as little as two parts by weight to ten parts of highly chlorinated organic binder. However, a highly effective mixture is composed of equal parts by weight of all three primary ingredients. The highly chlorinated organic binder may be reduced below thirty per cent of the mixture but if it is reduced too low it will not perform its chief function which is to dilute and retard the reactivity of the dechlorinating catalyst and the N-halogenated compound. In the absence of the highly chlorinated binder the chemical action which is heat-induced in the N-halogenated compound by the dechlorinating catalyst may spread beyond the heated zone and give a charred appearance to adjacent unheated areas.

When a surface coated with compositions taught by this invention is exposed to igniting temperatures, the ignition-preventing mechanism operates as follows: The dechlorinating catalyst causes splitting out of considerable volumes of flame-smothering gases from the highly chlorinated binder. At the same time, the catalyst induces profound exothermic changes in the N-halogenated substance. As a result of these changes a heavy evolution of additional flame-smothering gases results and at the same time intumescence of the coating occurs, with the result that a black porous covering remains as a fireproof coating on the protected surface. The incombustibility of this porous covering appears to be due at least in part to the presence of zinc chloride which forms as a partial result of the dechlorinating catalysis. The porosity of the coating provides effective insulation and prevents elevation of the temperature of the underlying surface to the point at which decomposition would become exothermic and self-propagating as would result ordinarily when the igniting flame continues to impinge on the combustible surface.

Since the compositions taught by this invention are, in the preferred form, white, that is, colorless, it will be desirable to incorporate therein opaque coloring materials to provide esthetic effects and to absorb actinic rays. Where the coatings are exposed to sunlight or outdoor conditions, colored opaque protective pigments must be added to prevent actinic decomposition. These coloring materials may be any of the usual oxide and earth colors, metallic bronzing pigments and other metallic-base pigmenting compounds.

Having fully disclosed my invention, I claim:

1. A flameproof coating composition comprising essentially a chlorinated material from the group consisting of chlorinated paraffin wax and chlorinated rubber; and an N-chloro compound from the class consisting of: acetyl chloramino-2,4-dichlorobenzene; N,N' dichloro-N,N' dibenzoyl ethylene diamine; N,N' quinonedichlorimine; 2,3,5-trichlorobenzoquinone (1,4) chlorimide; 2,5-dichlorobenzoquinone (1,4) bischlorimide; N-chlorophthalimide; N,N dichloro-4-carboxybenzene sulfonamide; dichloramine T; 1,3,4,6-tetrachloro-7-methyl-8-phenyl glycoluril; N,N dichlorodimethyl hydantoin; N,N dichlorobarbituric acid.

2. The coating composition of of claim 1, in which the binder is chlorinated paraffin wax.

3. The coating composition of claim 1, in which the binder is chlorinated rubber.

4. A flameproof coating composition comprising essentially a chlorinated material from the group consisting of chlorinated paraffin wax and chlorinated rubber; an N-chloro compound from the class consisting of: acetyl chloroamino-2,4-dichlorobenzene; N,N' dichloro-N,N' dibenzoyl ethylene diamine; N,N' quinonedichlorimine; 2,3,5-trichloro benzoquinone (1,4) chlorimide; 2,5-dichlorobenzoquinone (1,4) bischlorimide; N-chlorophthalimide; N,N dichloro-4-carboxybenzene sulfonamide; dichloramine T; 1,3,4,6-tetrachloro-7-methyl-8-phenyl glycoluril; N,N dichloro-dimethyhydantoin; N,N dichloro-barbituric acid; and a dechlorinating inorganic substance consisting at least one and not more than three compounds selected from the group consisting of zinc oxide, zinc hydroxide, and basic zinc carbonate.

5. The coating composition of claim 4, in which the dechlorinating inorganic substance is zinc oxide.

6. The coating composition of claim 4, in which the dechlorinating inorganic substance is zinc hydroxide.

7. The coating composition of claim 4, in which the dechlorinating inorganic substance is basic zinc carbonate.

8. The coating composition of claim 4, in which the binder is chlorinated paraffin wax and the dechlorinating inorganic substance is zinc oxide.

9. The coating composition of claim 4, in which the binder is chlorinated paraffin wax and the dechlorinating inorganic substance is zinc hydroxide.

10. The coating composition of claim 4, in which the binder is chlorinated paraffin wax and the dechlorinating inorganic substance is basic zinc carbonate.

11. The coating composition of claim 4, in which the binder is chlorinated rubber.

12. The coating composition of claim 4, in which the binder is chlorinated rubber and the dechlorinating inorganic substance is zinc oxide.

13. The coating material of claim 4, in which the binder is chlorinated rubber and the dechlorinating inorganic substance is zinc hydroxide.

14. The coating composition of claim 4, in which the binder is chlorinated rubber and the dechlorinating inorganic substance is basic zinc carbonate.

MARTIN LEATHERMAN.

REFERENCES CITED

The following references are of record in the file of this patent:

UNITED STATES PATENTS

| Number | Name | Date |
|---|---|---|
| 2,278,539 | Elliott | Apr. 7, 1942 |
| 2,299,612 | Clayton et al. | Oct. 20, 1942 |
| 2,326,233 | Leatherman | Aug. 10, 1943 |
| 2,334,710 | Kauth | Nov. 23, 1943 |
| 2,378,715 | Leatherman | June 19, 1945 |
| 2,390,408 | Young | Dec. 4, 1945 |

FOREIGN PATENTS

| Number | Country | Date |
|---|---|---|
| 557,081 | Germany | Aug. 18, 1932 |
| 588,131 | Germany | Nov. 13, 1933 |
| 590,796 | Germany | Jan. 9, 1934 |
| 486,162 | Great Britain | May 31, 1938 |

OTHER REFERENCES

American Dyestuff Reporter, Aug. 30, 1943, pp. 375–378 (article by Redmond on Fire resistant duck).